United States Patent
Johnson

[19]

[11] Patent Number: 5,809,847
[45] Date of Patent: Sep. 22, 1998

[54] METHOD OF MAKING ANVIL

[76] Inventor: James Floyd Johnson, 1004 Alton Circle, Florence, S.C. 29501

[21] Appl. No.: 927,002

[22] Filed: Sep. 10, 1997

Related U.S. Application Data

[63] Continuation of Ser. No. 708,855, Sep. 9, 1996, Pat. No. 5,732,591.

[51] Int. Cl.[6] ..................................................... B21K 5/00
[52] U.S. Cl. .............................. 76/109; 29/283; 29/417; D8/46; 72/476; 72/477
[58] Field of Search ............................. 72/476, 477, 458, 72/459, 457; 29/283, 412, 416, 417; D8/46; 76/101.1, 103, 109

[56] References Cited

U.S. PATENT DOCUMENTS

| 672,580 | 4/1901 | Wilcox | 72/477 |
| 733,085 | 7/1903 | Sheldon | 29/417 |
| 1,160,467 | 11/1915 | Tidwell | 72/477 |
| 2,149,902 | 3/1939 | Saurer | 29/417 |
| 2,998,876 | 9/1961 | Zlotek | 29/451 |

OTHER PUBLICATIONS

Techni–Tool Catlog 32, 5 Applolo Road, Plymouth Meeting, PA 19462 USA, page 145, second image down in upper right corner (Anvil), 1987.

*Primary Examiner*—David Jones
*Attorney, Agent, or Firm*—Walter F. Wessendorf, Jr.

[57] ABSTRACT

A solid-steel anvil of symmetrical configuration, having a top head, depending intermediate web and a base, and with the anvil being of light weight that a person can manipulatively grasp the anvil's top head with one hand to easily carry the anvil with his grasping hand, is produced by the method of providing a rectilinear elongated section, appropriately disposing the elongated section preparatory to successive cross-cuttings of the section, and cross-cutting successive lengths from the section to thereby provide a plurality of separate anvils.

2 Claims, 1 Drawing Sheet

METHOD OF MAKING ANVIL

This application is a continuation of prior application Ser. No. 08/708,855, filed Sep. 9, 1996, and now U.S. Pat. No. 5,732,591.

BACKGROUND OF THE INVENTION

1. Technical Field

This invention relates to a hand-carriable anvil and method of making same.

2. Background

A conventional anvil is not only expensive, heavy and cumbersome; but also can not be manipulatively grasped and carried by a person with one of his hands.

Since time immemorial, metal has been disposed and placed upon an anvil for purposes of straightening, bending and/or shaping the metal, by hand with a hammer. Metal objects can also be appropriately disposed and placed upon an anvil to perform other operations and procedures.

Electricians, mechanics, plumbers and other workers in the skilled trades, as well as "do-it-yourselfers" and home owners, have need for an anvil that is safe, light-weight, easily hand-carriable by a person with one of his hands, easily storable and significantly inexpensive, not only to straighten, bend and shape metal, but also to perform other operations and procedures.

SUMMARY OF THE INVENTION

Accordingly, the objects of the invention are to contribute to the solutions of the discussed problems of the art by providing an anvil that one person can grasp and carry by one of his hands for reason of its light weight and is safe to use and will retail for at about one-tenth of the cost, or less, of a conventional anvil to thereby meet the needs of electricians, mechanics, plumbers and other workers in skilled trades, as well as "do-it-yourselfers" and home owners.

The anvil of this invention is of solid steel and of symmetrical configuration, has a top head with a depending intermediate web of significant reduced thickness. The lower portion of the web flares out on both of its lateral sides to form and provide a base whose bottom surface is flat to afford and provide thereby for secure free-standing disposition and emplacement for the flat bottom of the anvil's base upon a work bench, support surface or other flat surface. The anvil's base is of substantially greater width, dimensionally, than the width of its top head to afford and provide thereby a safety factor to prevent the anvil from toppling-over and possibly injuring a human operator in the event a forceful hammer blow is struck by such human operator upon either of the lateral top edges of the top head. There are two reasons why a person can carry the anvil with one hand. The first reason is a variety of anvil weights are available, ranging from less than twelve pounds to not more than nineteen and a half pounds. The second reason is that the width of the anvil's top head is significantly less than the width of the anvil's base, which together with the anvil's weight allows a person to easily carry the anvil with one hand by simply manipulatively grasping the top head with one hand. The factor of the variety of the anvil's weights allows the anvils to be retailed at about one-tenth the cost, or less, than conventional anvils.

Examples of a partial list of the need for and the utility to which the anvil of this invention can be put are:

A bent window-screen's metal frame can be staightened by appropriately disposing and emplacing the bent-frame's portion upon the top surface of the anvil's top head to allow a human operator to appropriately hammer such bent portion to straighten same.

Drilling a hole correctly through a metal plate is often difficult because the steel drill bit will slide upon its contact with the metal plate. The metal plate can be prepared for correct drilling of the hole by a human operator's appropriately disposing the metal plate upon the top surface of the anvil's head, followed by prick-punching the metal plate whereat the hole is to be drilled by interposing a prick punch and hammering the interposed prick punch with a hammer.

A rectangular or octagonal metal receptacle outlet box can be appropriately disposed and emplaced upon the top surface of the anvil's top head, followed by hammering an interposed punch to remove a knockout from the box to mount a wire connector in the hole provided by removing its knockout.

An octagonal receptacle outlet box previously recessed too much in its original installation in a ceiling, such that the recessed box's cross-mounting bracket correspondingly will not allow a new ceiling lighting fixture to be properly mounted and installed, can be rectified by removing the old ceiling fixture and old cross-mounting bracket, preparatory to which, for safety, the circuit breaker controlling electrical power to such ceiling fixture should be switched off. Thereafter, the cross-mounting bracket can be appropriately disposed upon the top surface of the anvil's top head for two successive and simple procedures of hammering each of the end portions of the old cross-mounting bracket appropriately to bend such end portions inwardly, replacing the old cross-mounting bracket on the box to allow the new lighting fixture to be mounted.

A motor vehicle's bent or misaligned metal control rod, located beneath the vehicle's front hood, can be removed after unlatching and opening the front hood to gain physical access to the control rod. Preparatory to removing the control rod, the battery's ground cable, for safety, should be removed. Thereafter, the control rod is appropriately removed and then appropriately disposed and emplaced upon the top surface of the anvil's top head to hammer the control rod straight or realign same. Then the straightened or realigned control rod is appropriately remounted, the battery's ground cable is reconnected, followed by appropriately closing, relatching the front hood.

Some motor vehicles have a slotted, belt-tensioning take-up arm mounting an alternator whose pulley is driven by an alternator belt trained around both the alternator's driven pulley and the main drive pulley. The take-up arm can be slightly bent or misaligned when another belt driven by the main drive pulley breaks, flies off and wedges itself between the alternator belt and the alternator's driven pulley. The problem is aggravated when the other belt breaks, flies off and so wedges itself at a time the vehicle is being operated at high speed. After the ignition is turned off, the vehicle's front hood is unlatched and opened to gain physical access to the alternator's take-up arm and the battery's ground cable is removed, the take-up arm is appropriately removed, along with any remaining remnants of the broken belt. The bent or misaligned take-up arm is then appropriately disposed and emplaced upon the top surface of the anvil's top head, followed by the take-up arm being straightened or realigned by appropriately hammering same. Thereafter, the take-up arm is remounted and the alternator belt is retensioned. The broken belt is replaced with a new belt, the battery's ground cable is reconnected and the front hood is appropriately closed to relatch same.

Pipe-lock seams are used in smoke stacks, duct work and other places. When many pipes are tied together, a pipe-lock seam is often used because it is much better and easier than using a weld. The edge is put on the sheet in the workplace with a machine. When the correct size is determined, a hammer and anvil are used to appropriately seam the sheet metal.

BRIEF DESCRIPTION OF THE DRAWINGS

These objects and other objects of the invention should be discerned and appreciated from the description, taken in conjunction with the drawing figures, wherein like reference numerals refer to similar parts throughout the several views, in which.

DESCRIPTION

U.S. railroads use steel "T-rail" sections of symmetrical configuration and whose rectilinear lengths are either 39 feet or 78 feet. Reference is made, as an example, to specifications 2007 issued Oct. 31, 1989 by CSX Transportation, Jax Gen Office Bldg, 15th Floor, Speed Code J120, 500 Water Street, Jacksonville, Fla. 32202, a copy of which is attached hereto and made a part hereof, which set forth 29 "T-rail" sections whose weights per yard range from 85 pounds to 140 pounds, heights range from 5 ¼ to 7 ⁵⁄₁₆ inches, base widths range from 5 to 6 inches, web thicknesses range from ¹⁷⁄₃₂ to ¾ of an inch and widths of their top heads range from 2 ⁹⁄₁₆ to 3 inches. Upon its breakage, a broken rail section must be removed, scrapped and replaced with the same type of rail section of the same length. In practicing the method of this invention, separate anvils of 5-inch length are produced by square cross-cutting remaining rectilinear-length portions or workpieces from the scrapped 39-foot and 78-foot T-rail sections. As a matter of practicality and convenience, the workpieces are of one-yard lengths, with each one-yard length workpiece being successively square cross-cut to produce seven anvils of 5-inch lengths. Per the "2007" specifications, the weights of the anvils will range from 11.81 to 19.44 pounds. Hence, 29 different hand-carriable anvils of 5-inch lengths can be produced that will correspondingly vary as to their respective weights, heights, top-head widths, web thicknesses and base widths to meet the particular individual needs and preferences of electricians, mechanics, plumbers and other workers in skilled trades, as well as "do-it-yourselfers" and homeowners.

Figure 1:
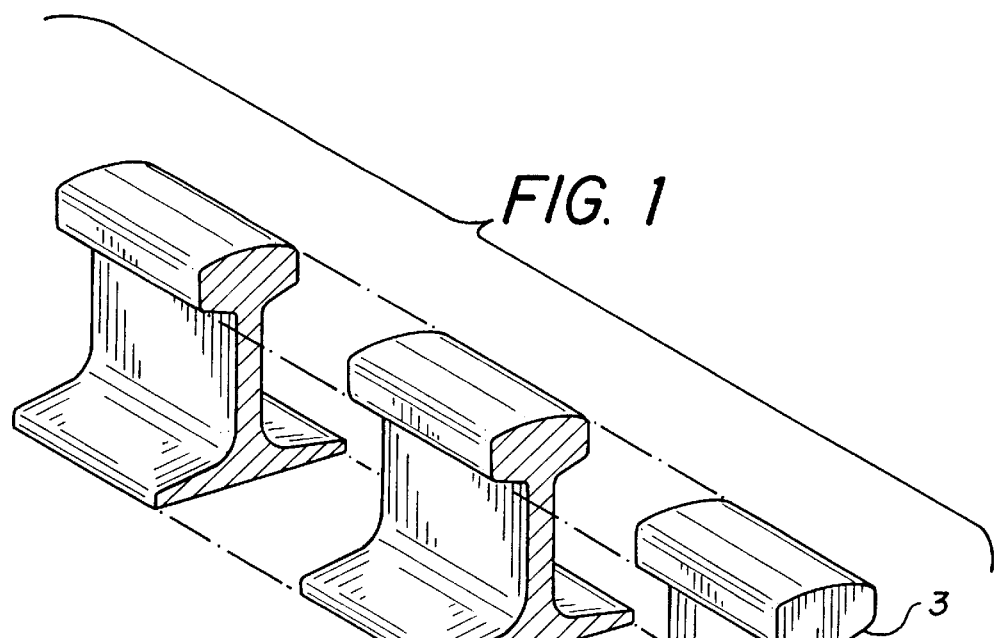
FIG. 1 is a perspective view representing an unspecified length of railroad T-rail section from which the anvils of this invention are square cross-cut by practicing the method of this invention.

In FIG. 1, reference numeral 1 generally refers to an unspecified length of railroad T-section workpiece having a top head 3, depending intermediate web 5 and base 7 with a flat bottom 9.

Reference is made to Enco's Model 136-2616 9"×16" conventional horizontal square cross-cutting band saw that appears on page 7 of the current catalog of Enco Manufacturing Company, 5000 West Bloomingdale Avenue, Chicago, Ill. 60639-4587, a copy of which is attached hereto and made a part hereof.

The work table of Enco's horizontal band saw allows crosswise emplacement thereon of the flat bottom 9 of the base 7 of the workpiece 1 between the opposed facing adjustable vise jaws operatively mounted on the work table. Retentive tightening of the jaws against the interposed workpiece 1 is effected by appropriate rotation of an operatively controlling hand wheel in one direction, preparatory to effecting a square cross cut of the workpiece 1. After such cut is effected, the jaws are released from their retentive engagement with the workpiece 1 by appropriate rotation of the hand wheel in its opposite direction to allow appropriate sliding of the workpiece sufficiently between the freed jaws preparatory to effecting the next 5-inch, square cross cut of the workpiece 1, followed by again effecting such retentive tightening of the jaws against the workpiece 1. This procedure is successively repeated until all the 5-inch, square cross cuts of the workpiece have been effected.

Figure 2:
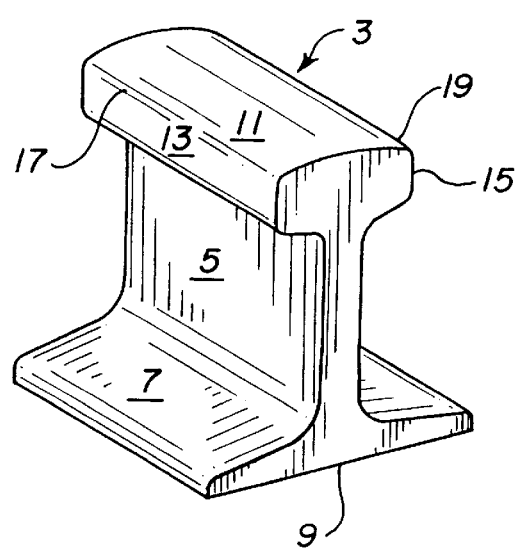
FIG. 2 is a perspective view of an anvil of this invention.

Shown in FIG. 2 is a representative anvil of symmetrical configuration produced by the method of square cross-cutting of a T-rail-section workpiece, as hereinbefore described with reference to FIG. 1. The top head 3 of the anvil defines a top surface 11 and opposed lateral surfaces 13 and 15, further defining respective lateral top edges 17 and 19 with the top surface 11 of the top head 3. Since the width of the base 7 is substantially greater, dimensionally, than the width of the top head 3, as defined by its lateral surfaces 13 and 15, a safety factor is provided the anvil thereby, in free-standing emplacement of the flat bottom 9 of the base 7 upon a support surface, to prevent the anvil from toppling-over and injuring a human operator in the event his misdirected and forceful hammer blow is struck directly upon either of the lateral top edges 17 or 19.

Figure 3:
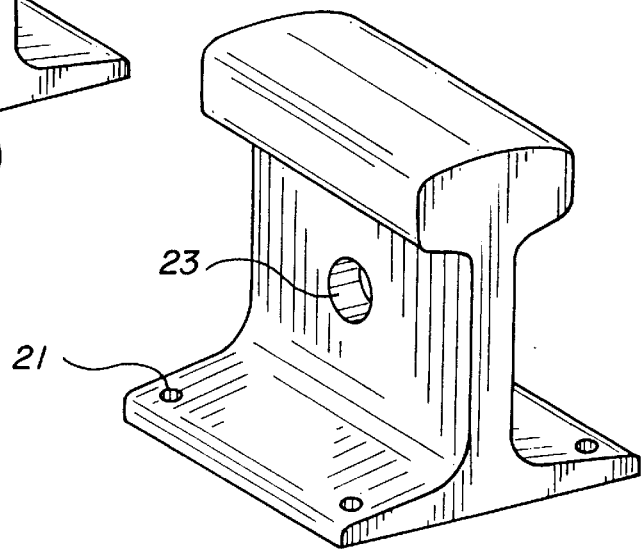
FIG. 3 is a perspective view of a modification of the anvil shown in FIG. 2.

Shown in FIG. 3 is a modification of the anvil shown in FIG. 2 in that four vertical holes 21 (only three of which are shown) are drilled through the base 7 and a horizontal center hole 23 is drilled through the web 5. The purpose of the corner holes 21 is to fixedly mount the base 7 to a support structure, such as a wood work bench, by disposing mounting screws through the corner holes 21 to fixedly mount the base 7 upon the work bench. The purpose of the center hole 23 is to allow appropriate insertion of metal tubing or conduit within the center hole 23 to appropriately bend the tubing or conduit to the shape and extent as may be required.

I claim:

1. A method of making solid-steel anvils of an appropriate length with each appropriate-length anvil being of such light weight that a human operator can manipulatively grasp and carry the anvil with a grasping hand, with each anvil produced being symmetrical in cross-section when taken along its horizontal extent in vertical planes and at right angles thereto, with each anvil produced having a top head, an intermediate web and a base, with the base having a width and the top head having a width, with the base's width being substantially greater than the top-head's width for thereby providing a safety factor in preventing the anvil from toppling-over, and with the base of each anvil produced being of rectangular configuration and defining corners, and with the base of each anvil produced having a flat bottom for free-standing emplacement upon a support surface, and with the rectangular base having a round hole through each of the base's corners to receive mounting screws for fixedly mounting the base upon such support surface; the method comprising the steps of providing a solid-steel, rectilinear and elongated section that is symmetrical in cross-section when taken along the section's horizontal extent in vertical planes and at right angles thereto, with the section having, correspondingly, a top head, depending intermediate web and a base, with the base being of rectangular configuration and having a flat bottom, with the base having a width and the top head having a width, with the base's width being substantially greater than the top-head's width; the method comprising the steps of disposing the section preparatory to successive square cross-cuttings of the section; effecting successive square cross-cuttings of the section to produce separate anvils, each of which is of the appropriate length and of such corresponding light weight, and with the base of each anvil produced being of rectangular configuration and defining corners; and providing a round hole through each of the corners of the rectangular base of each anvil produced.

2. The method according to claim 1, wherein the method comprises the additional step of providing a round center hole through the web of each anvil produced for receiving and bending metal tubing or conduit to a shape and extent as may be required.

* * * * *